Figure 1:
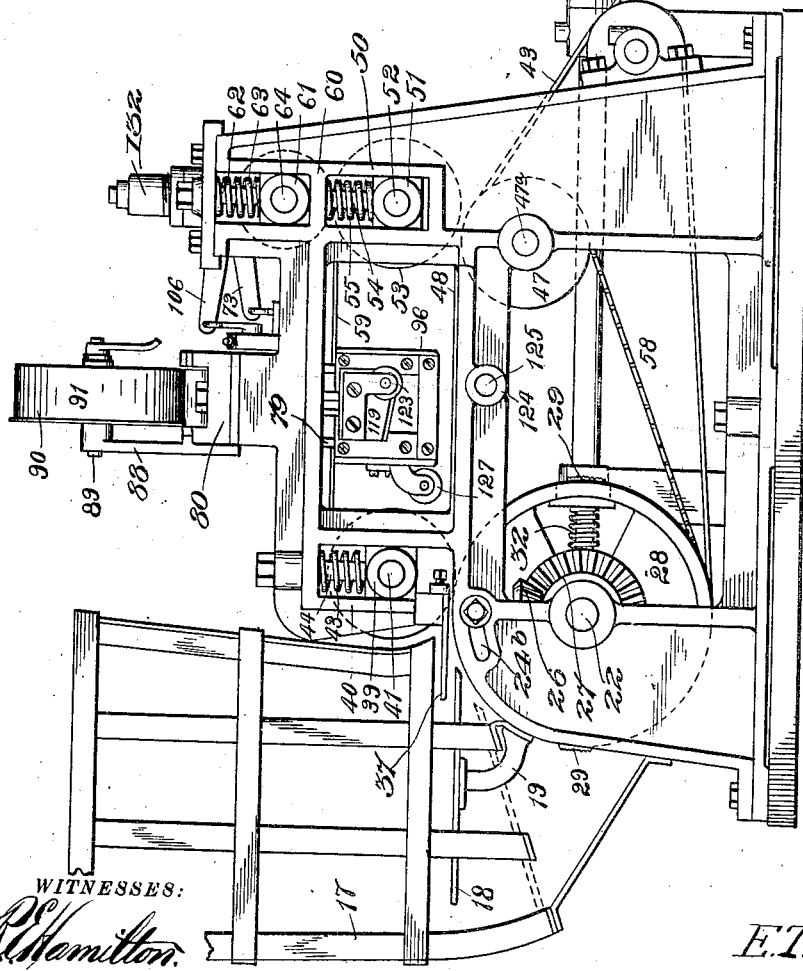
Figure 2:
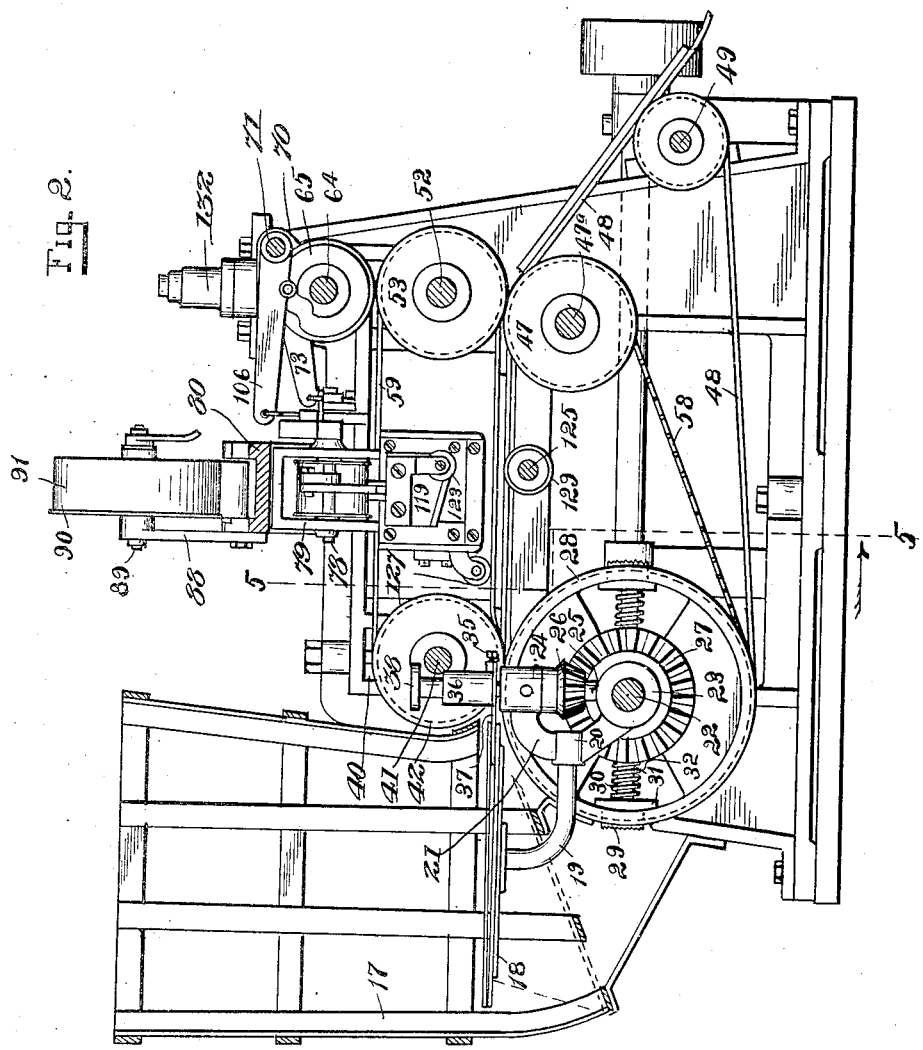
Figure 8:
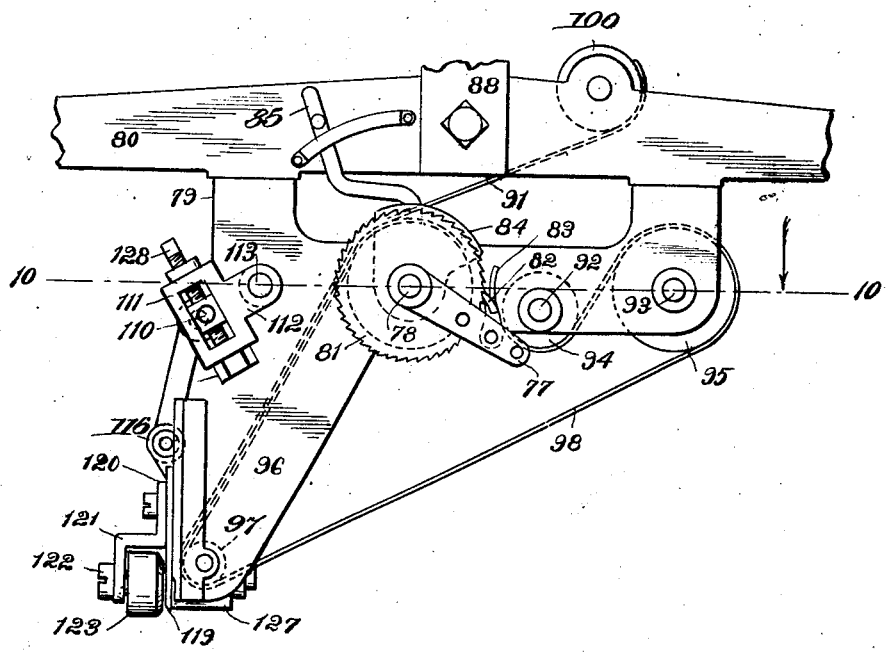
Figure 10:
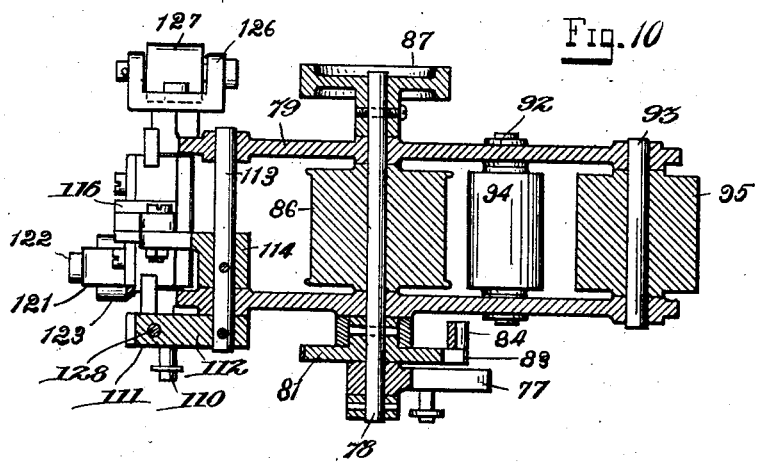

E. T. WINKLER.
ADDRESSING MACHINE.
APPLICATION FILED JULY 5, 1910.

1,044,616.

Patented Nov. 19, 1912.
8 SHEETS—SHEET 1.

WITNESSES:
R. Hamilton
Myrtle M. Jackson

INVENTOR.
E. T. Winkler,
BY
Arthur C. Brown
ATTORNEY.

E. T. WINKLER.
ADDRESSING MACHINE.
APPLICATION FILED JULY 5, 1910.

1,044,616.

Patented Nov. 19, 1912.

8 SHEETS—SHEET 2.

WITNESSES:

INVENTOR.
E. T. Winkler,
BY
ATTORNEY.

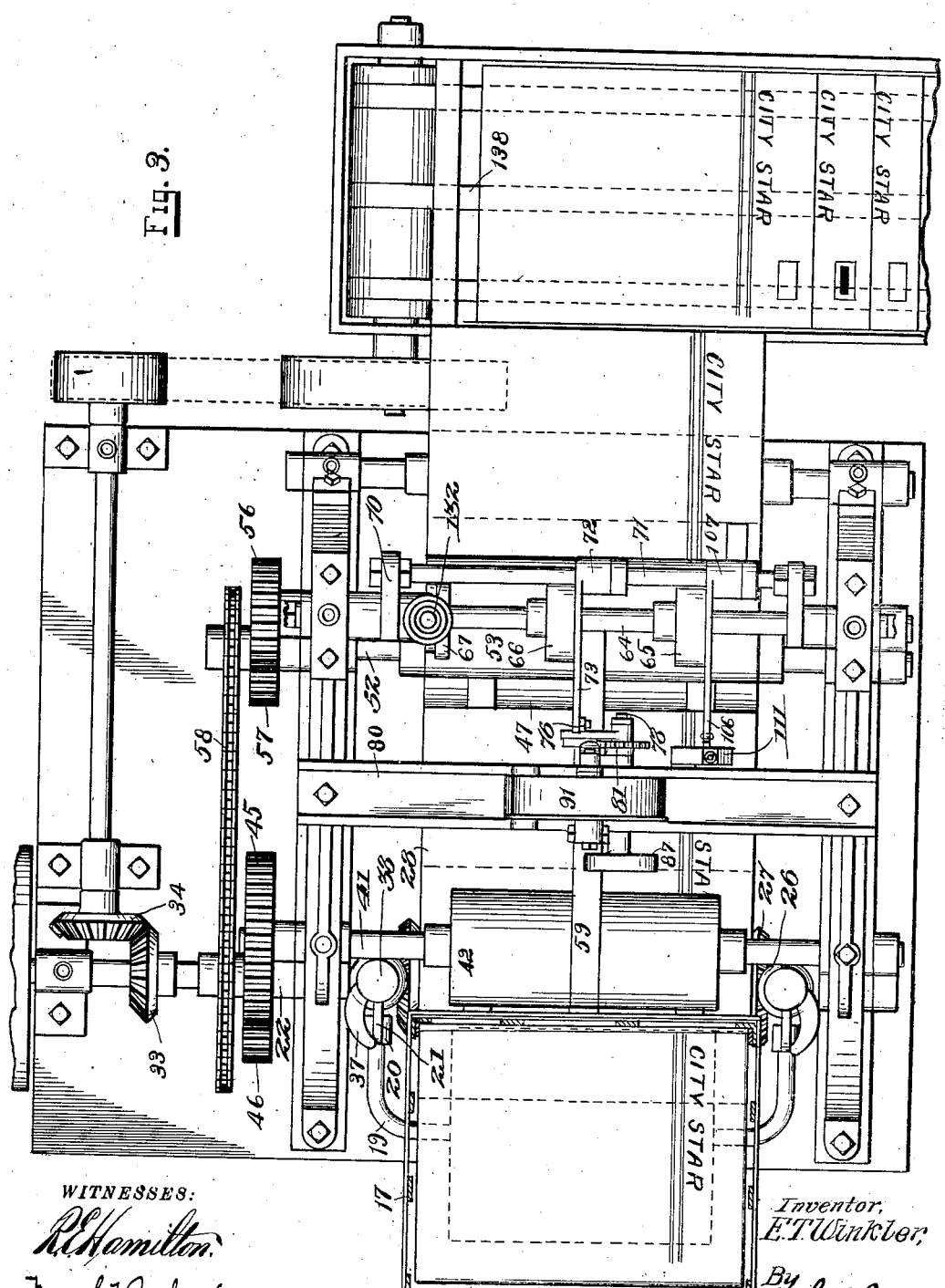

E. T. WINKLER.
ADDRESSING MACHINE.
APPLICATION FILED JULY 5, 1910.
1,044,616.
Patented Nov. 19, 1912.
8 SHEETS—SHEET 4.
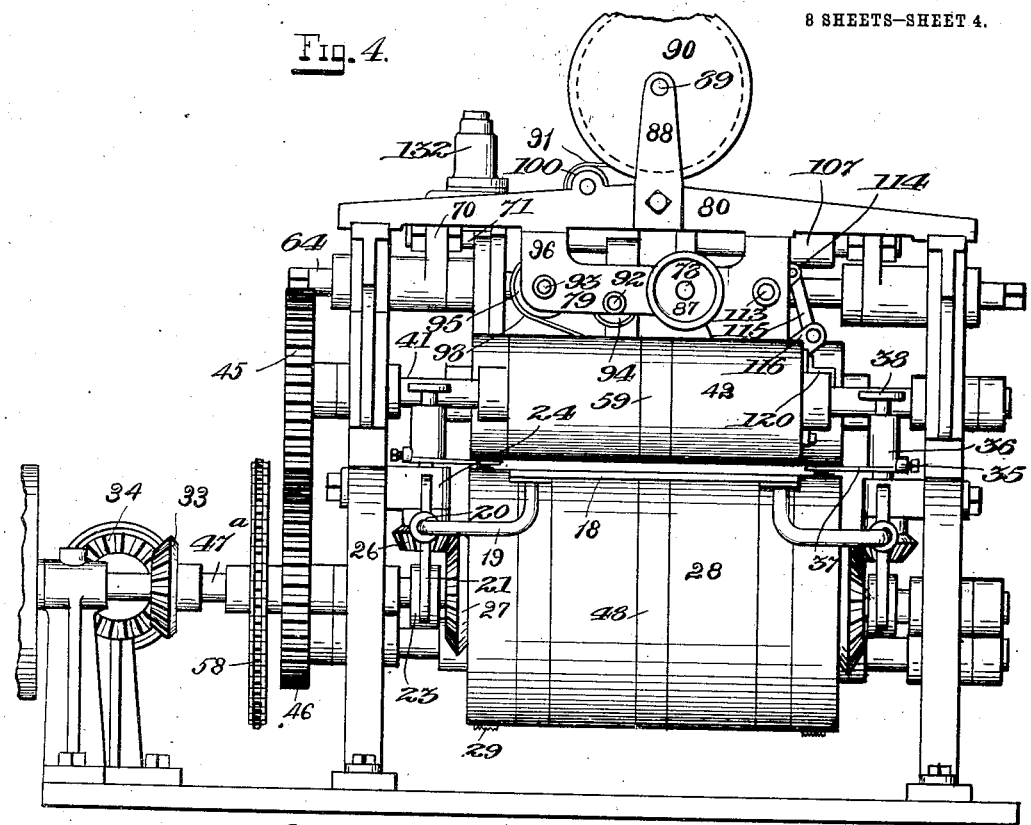
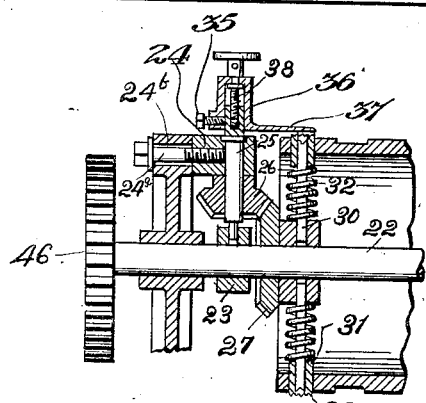
WITNESSES:
INVENTOR.
E. T. Winkler,
BY
ATTORNEY.

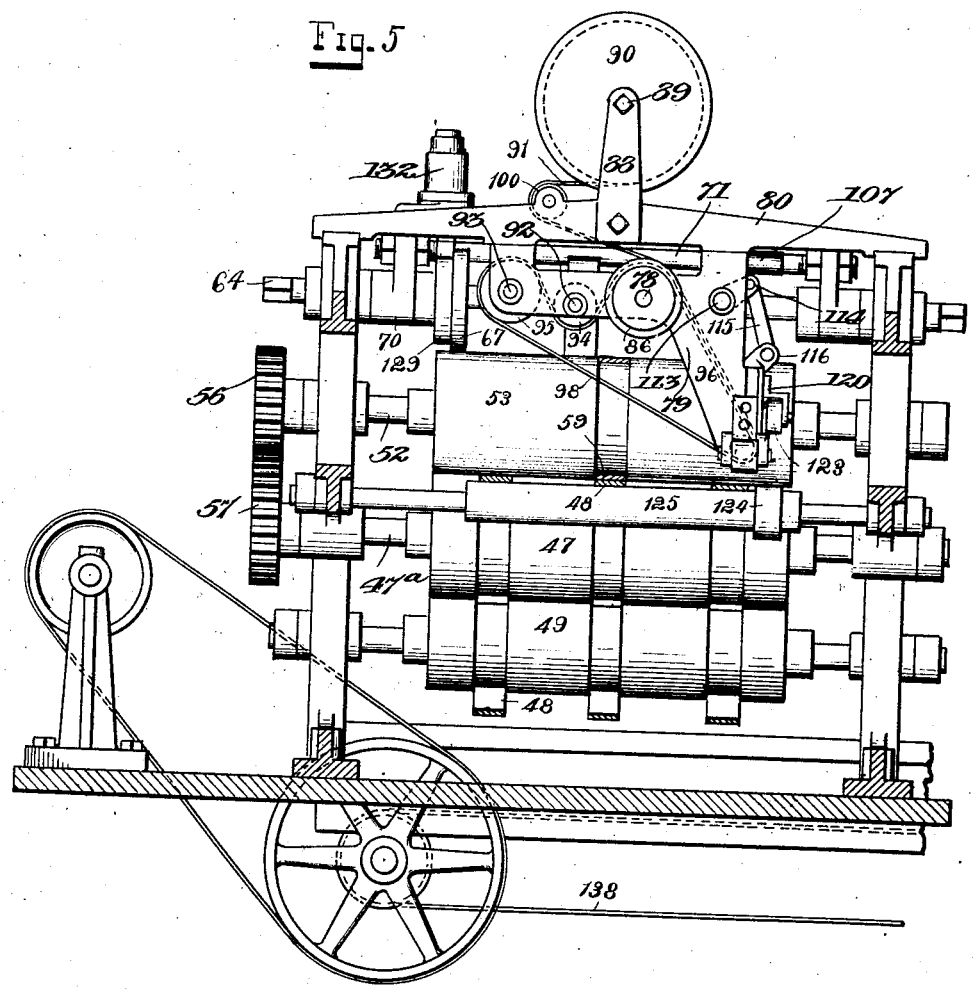

E. T. WINKLER.
ADDRESSING MACHINE.
APPLICATION FILED JULY 5, 1910.
1,044,616.
Patented Nov. 19, 1912.
8 SHEETS—SHEET 7.
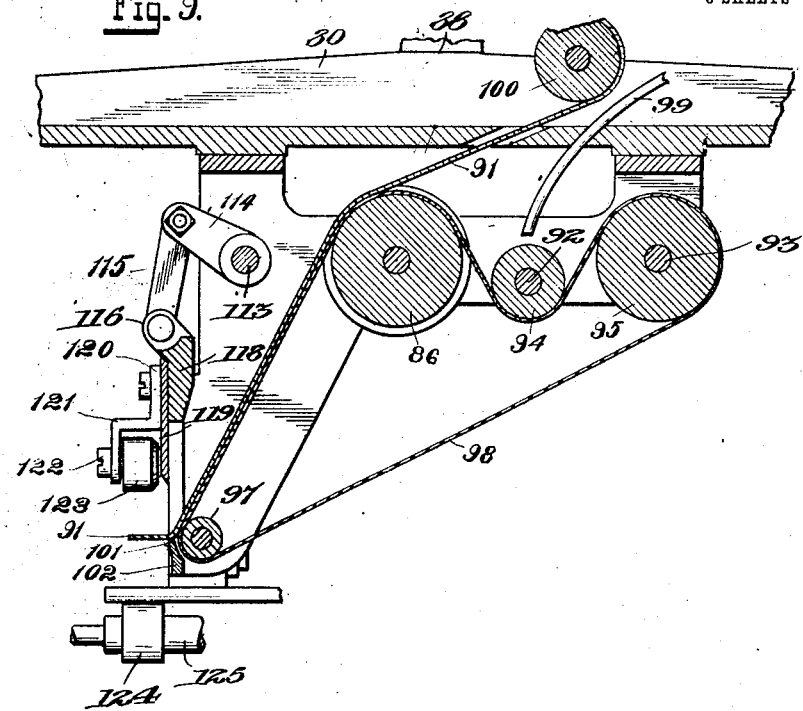
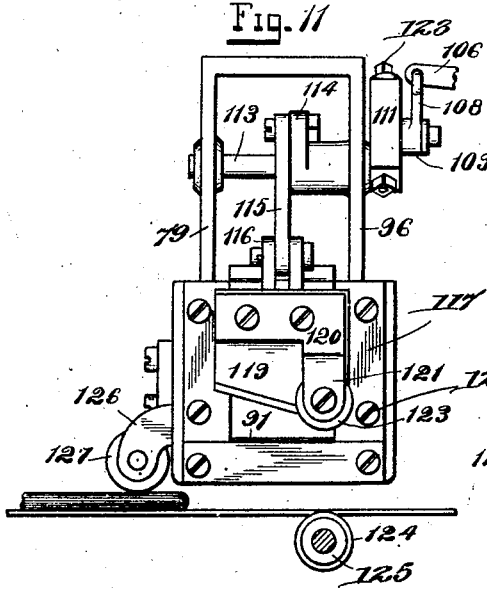
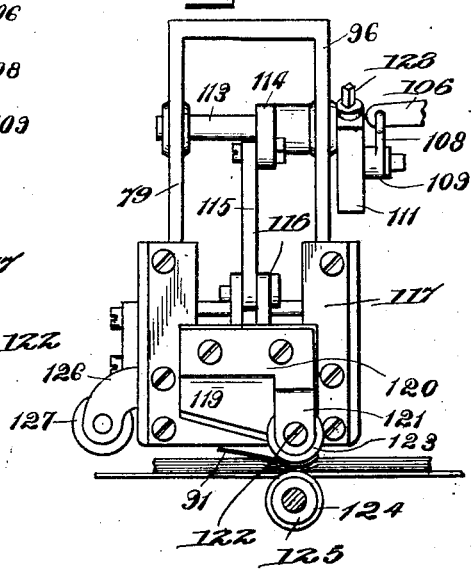
WITNESSES:
INVENTOR.
E. T. Winkler,
BY
ATTORNEY.

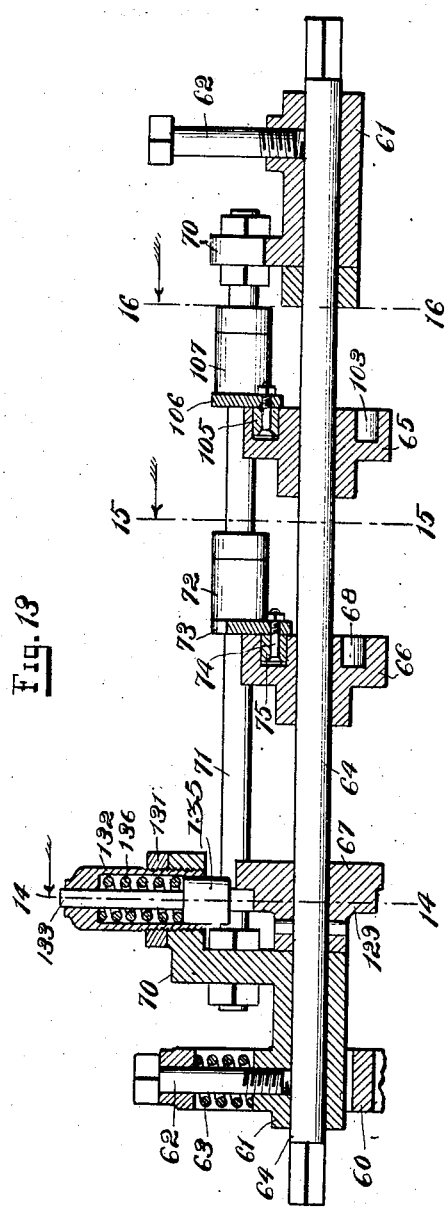

UNITED STATES PATENT OFFICE.

EHREGOTT T. WINKLER, OF KANSAS CITY, MISSOURI, ASSIGNOR TO HARRY HERVEY, OF KANSAS CITY, MISSOURI.

ADDRESSING-MACHINE.

1,044,616.  Specification of Letters Patent.  Patented Nov. 19, 1912.

Application filed July 5, 1910. Serial No. 570,254.

*To all whom it may concern:*

Be it known that I, EHREGOTT T. WINKLER, a citizen of the United States, residing at Kansas City, in the county of Jackson and State of Missouri, have invented certain new and useful Improvements in Addressing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an addressing machine, and more particularly to a machine for addressing newspapers, magazines, etc., a great number of which must be prepared for mailing in a short time after they are printed.

The object of my invention is to provide a device of the class described which will receive the papers as they come from the press and paste a printed slip on each paper as it passes through the machine; automatic mechanism being provided for properly spacing the papers, feeding the web bearing the addresses, and cutting the web into separate addressed slips and pressing the slip onto the paper. In accomplishing this object I have provided the improved details of structure which will presently be fully described and pointed out in the claims, reference being had to the accompanying drawings forming part of this specification, in which like reference numerals refer to like parts throughout the several views and in which:—

Figure I is a side elevation of a machine constructed according to my invention. Fig. II is a similar view without the off-bearing basket, the side of the frame being removed for better illustration. Fig. III is a top plan view of the machine. Fig. IV is a front elevation, the receiving cage being removed for better illustration. Fig. V is a front view on the line 5—5, Fig. II. Fig. VI is a detail view in central vertical section of a portion of the cylinder and paper forwarding mechanism. Fig. VII is an end view of the cylinder. Fig. VIII is a detail view of the web forwarding and knife mechanism. Fig. IX is a central vertical section of Fig. VIII. Fig. X is a horizontal section on the line 10—10, Fig. VIII. Fig. XI is a front detail view of Fig. VIII, showing the knife in its raised position. Fig. XII is a similar view with the knife lowered. Fig. XIII is a central vertical section of the cam rollers operating the web forwarding and knife mechanisms. Fig. XIV is a vertical sectional view on the line 14—14, Fig. XIII. Fig. XV is a similar view on the line 15—15, Fig. XIII, showing the cam operating the web mechanism. Fig. XVI is a similar view on the line 16—16, Fig. XIII, showing the cam operating the knife mechanism.

Referring more in detail to the parts:— 17 represents a chute or cage into which the folded papers are fed as they come from the press and which is curved inwardly at the bottom as shown in Figs. I and II. In cage 17, near the bottom, is a platform 18, carried by the arms 19 which project rearwardly and are rigidly secured in sockets 20 in the wings 21; each of said wings being loosely mounted at its lower end on the main shaft 22 by a bearing 23. At their upper ends, wings 21 are provided with bearings 24 through which extend, and in which revolve the shafts 25, said shafts being revolubly mounted at their lower ends in sockets in bearings 23. Keyed to shafts 25 between bearings 23 and 24, are the miter-wheels 26, adapted to mesh with the wheels 27 on the ends of the cylinder 28 carried by the main shaft 22.

24ª is a rod extending outwardly from bearing 24 and traveling in the slot 24ᵇ in the machine frame.

Cylinder 28 extends almost the entire width of the machine within the main frame and in its periphery, near each end, is provided with a pair of diametrically opposed slots through which project the toothed dogs 29 which are slidable on rods 30 extending outwardly from the cylinder hub and have the flanges 31 which abut against the inner surface of the cylinder and determine the distance the dogs shall project beyond the periphery of the cylinder.

32 are coil springs surrounding rod 30 and abutting against the flanges 31 and the cylinder hub for yieldingly retaining dogs 29 in their projected position.

33 is a miter-wheel on shaft 22 meshing with a wheel 34 on a suitable driving mechanism by which shaft 22 is revolved.

Rigidly secured to the vertical shafts 25 by set screws 35 are the hubs 36 of the fingers 37 by which the papers are carried forward from the cage, the height of the fingers being regulated by screws 38 projecting through the tops of hubs 36 into threaded sockets in the ends of shaft 25.

Journaled at each end in a block 39, slidably mounted in the vertical guides 40 on the main frame above cylinder 28, is a shaft 41 carrying a roller 42 which is normally held in yielding contact with cylinder 28 by the coil springs 43 surrounding the rods 44, which latter extend upwardly from blocks 39 through a perforation in the top of the machine frame, said spring abutting against said blocks and the under side of the frame top.

45 is a spur wheel on shaft 41 meshing with a spur wheel 46 on the cylinder shaft and being so adjusted that roller 42 will be driven through one complete revolution upon each revolution of the cylinder.

When the machine is in operation the revolution of the cylinder causes shafts 25 to be revolved by means of miter-wheels 26 and 27, carrying fingers 37 around between the folds of the bottom paper in the cage, the further revolution causing the fingers and paper to be forwarded between the dogs projecting through cylinder 28 and roller 42, the fingers being so adapted as to make two complete revolutions to one revolution of the cylinder and meet the dogs 29 on a line perpendicular to the main shaft, so that as the paper is brought forward it is pressed between the dogs 29 and roller 42, the springs 43 yielding sufficiently to permit the passage of the paper therebetween.

In the rear of the machine is mounted a roller 47 of less diameter than cylinder 28 but with the upper plane of its travel in line with the upper plane of travel of the cylinder, so that the belts 48, which run over said cylinder and roller and over the roller 49, at the rear of the machine, will travel horizontally in their upper paths.

In each side of the main frame and slightly to the rear of roller 47, are the vertical guides 50, in which are mounted the vertically sliding blocks 51 having bearings in which is journaled the shaft 52 of a roller 53. Loosely fitting in a socket in the blocks 51 are rods 54 extending downwardly from the top of the guides; surrounding said rods and bearing against the tops of the guides and against the blocks are coil springs 55, adapted to retain blocks 51 in their lowered positions. 56 is a gear wheel rigid on shaft 52 and meshing with a gear wheel 57 on the shaft 47ª of roller 47, and 58 is a chain belt running over sprocket wheels on the shaft 47ª and the main shaft, so that upon the revolution of the main shaft, the rollers 47 and 53 will also be revolved.

Running over roller 53 and the forward roller 42 is the belt 59, so that as the papers are fed into the machine, as before described, they will be caught between the belts 48 and 59 and carried into the machine. As the paper reaches the rollers 47 and 53 it is carried therebetween and roller 53 being held yieldingly in its lowered position is raised against the tension of springs 55 a distance substantially equal to the thickness of the paper when compressed. As roller 53 is raised, its periphery comes in contact with the peripheries of a set of cam rollers operating the web feeding end knife mechanisms which I will now describe.

In the main frame above guides 50 are similar guides 60 in which are mounted the vertically sliding blocks 61 having the pins 62 and coil springs 63 arranged and operating in a manner similar to those described with reference to guide 50, and carrying a shaft 64 on which are rigidly mounted the cam rollers 65—66—67, the roller 66 having in its face a path 68, circular throughout the greater part of its length but having a short swell 69.

Integral with each of blocks 61 on the inner side of the frame is a rearwardly projecting dog 70 in which is secured the rod 71, and revolubly mounted on rod 71 is the hub 72 of a forwardly projecting lever arm 73. On arm 73 is a stub axle 74 which projects into the path 68 in cam 66 and carries a roller 75 adapted to revolve therein. Depending from the free end of arm 73 is a link 76 which is connected at its lower end with a crank arm 77 rigid on the end of an axle 78 extending through and projecting from each side of a frame 79 depending from the cross brace 80 carried on the main frame.

Rigid on axle 78 adjacent to crank arm 77 is a ratchet wheel 81, and pivoted on the crank arm is a pawl 82 adapted to engage the teeth of the wheel 81. Pawl 82 has a nose 83 extending over the pawl tooth to be engaged by a plate 84 carried by axle 78, whereby said pawl is thrown out of engagement with the ratchet wheel when the former is raised against plate 84. 85 is a lever on plate 84 by which said plate is adjusted to regulate the sweep of pawl 82. On axle 78 within frame 79 is a drum 86 and rigid on the forward end of the axle is a hand wheel 87.

Extending upwardly from the sides of cross brace 80 are the standards 88, carrying at their upper ends an axle 89 on which is mounted a drum 90 carrying a web 91 on which addresses are printed at regular intervals. Mounted between the sides of frame 79 are the axles 92 and 93 carrying rollers 94 and 95 and between the lower ends of the downwardly projecting portion of frame 79 is axially mounted the roller 97.

98 is a belt running over drum 86, rollers 97 and 95 and under the roller 94, the latter acting as a spreader by which the paste delivered through a tube 99 from a suitable receptacle is evenly distributed on belt 98. As the web is fed from its carrying drum it travels over an idler 100 carried on cross brace and onto the pasted face of belt 98 and, adhering thereto, is carried downwardly therewith until it comes in contact with a nose 101 on a cross plate 102 of frame 79, which nose separates the web from the belt and guides it outwardly through the knife frame and beneath the knife blade, as shown in Fig. IX.

Also rigid on shaft 64 is the cam roller 65, having a path 103 on its face which is circular throughout the greater part of its length but has a dip 104 therein. Traveling in path 103 is a roller 105 carried by the lever arm 106, the hub 107 of which is loose on shaft 71. Pivoted to the free end of arm 106 is the yoke 108 of a crank arm 109, which arm is carried by a block 110, sliding in a box 111. Box 111 has a rearwardly projecting arm 112 rigidly secured on a shaft 113 journaled in bearings in and extending through frame 79. Also rigid on shaft 113 is the crank arm 114 having pivoted thereto the upper end of the link 115, the lower end of which is pivoted in the yoke 116 on the knife frame 117, which frame extends across frame 79 and plate 118 to which the blade 119 is secured. Plate 118 is beveled at its lower edge and is adapted to press the web 91 against the cross piece 102 of frame 79, when the knife is lowered to limit the downward movement of the knife.

On frame 117 is the bracket 120 having the forwardly and downwardly projecting arm 121 which carries a stub axle 122 on which is loosely mounted the roller 123, said roller extending downwardly below knife 119 in order that it may press the addressed slip onto the paper and hold it there as the paper is being cut.

124 is a sleeve on a roller 125 revolubly mounted between the sides of the main frame against which roller 123 presses the paper when lowered; roller 125 acting as a support for belts 48 and belt 59 which conduct the paper through the machine.

On frame 79 is a rearwardly projecting roller 127 adapted to impinge against and guide the paper under frame 79.

Box 111 is provided at both top and bottom with perforations through which is extended a threaded adjusting pin 128 which pin extends through and meshes with internal threads in a perforation in block 110. By turning pin 128 forward or back, block 110 may be raised or lowered to secure a correct adjustment of the knife.

When the parts are properly adjusted, an addressed portion of the web is always projected ready to be stamped on a paper, the first operation being the lowering of the knife mechanism which presses the slip on the paper and cuts the slip from the web and is then raised to its normal position; the web forwarding mechanism then operates to feed another slip forward; for this reason the cam rollers before described have been arranged as shown in Figs. 15 and 16, where the roller on the knife operating arm is shown on the edge of the cam dip and ready to operate as soon as the driving mechanism has started in operation; the swell of the cam operating the web forwarding mechanism must therefore be in position to rock lever arm 73 after the knife has been raised to its normal position; for this reason the swell of cam 66 is in a relatively opposite position to the dip in cam 65. As the shaft 64, on which the cam rollers are mounted, is operated by friction with roller 53, after the latter has been raised thereagainst, the rollers and cams must be so adjusted as to leave the cams in the same position at the end of each revolution of the roller, and as a jar of the machine might carry the cams slightly forward or back sufficiently to interfere with the proper operation, I have provided the following mechanism for retaining shaft 64 in its correct position after each revolution.

On shaft 64 is the roller 67 having the annular shoulder 129 in which is a pocket 130 having inclined sides. 131 is a bracket on the adjacent block 70 carrying a cup 132 through the top of which projects the rod 133 having at its lower end a rounded head 134 adapted to fit within the pocket 130 on shoulder 129; 135 is a collar on rod 133 and 136 is a coil spring surrounding rod 133 within cup 132 and pressing against the collar 135 to yieldingly retain same against roller 67 and the head of rod 133 in pocket 130; roller 67 being so arranged that when the cam rollers 65 and 66 are in the positions shown in Figs. 15 and 16 the pocket in shoulder 129 will be in its uppermost position with head 134 therein; the parts retaining shoulder 129 in this position and preventing the revolution of shaft 64 until engaged by the lower roller as before described. At a completion of a revolution of shaft 64 should the rollers not quite gain their correct position, head 134 will be forced into the pocket in shoulder 129 and, traveling down the inclined sides, will carry the shaft slightly forward or back to the correct position. As the paper is passed between rollers 47 and 53 it is delivered to an inclined track 137 down which it slides to an off-bearing carriage 138.

In use, power is applied to the driving mechanism and a number of papers placed in the receiving cage in which they descend onto platform 18; if only a few papers are fed in, the platform will maintain its upright position, but should a sufficient number be placed in the cage their weight will depress the platform, which is loosely mounted on the cylinder shaft, until the papers rest on the curved lower sides of the cage, in order that the pressure on the bottom paper may be the same no matter how many papers there may be in the cage.

The miter gear wheel on shaft 25 being always in mesh with the gear wheel on the main cylinder, shaft 25 is constantly revolved no matter what position the platform may be in and the fingers 37 on said shaft entering between the folds of the paper carry the latter forward between the serrated dogs projecting from the cylinder and the roller 42 and between the belts running over said cylinder and roller which carry it beneath the addressing and knife mechanisms. As the edge of the paper passes between rollers 47 and 53 the upper roller 53 is raised against the cam roller on shaft 64, the friction causing the revolution of shaft 64 and its rollers. As soon as these parts begin to revolve, the roller on the knife arm, traveling in the path in cam roller 65, is carried downwardly into the dip 104, dragging the lever arm 106 downwardly and lowering the knife mechanism as described. As this mechanism is lowered the roller 123 and the lower edge of the knife come in contact with the projecting edge of the addressed web, the knife cutting a slip therefrom which the roller presses onto the paper.

As the dip in cam 65 extends through but a small part of the path, the arm 106 is soon carried up again, raising the knife mechanism to its original position. As the shaft 64 continues to revolve, the roller 75 is carried into the swell in the cam path on roller 68, and lever arm 73 is raised; such action raising pawl 82 against its ratchet wheel, revolving the drum 86 and feeding the belt 98 forward. The belt having received paste from the tube emptying onto the spreading roller 94 causes the addressed web, which is run down from the drum above, to adhere thereto and carries it down till it is separated from the belt by the nose 101 and projected outwardly a suitable distance in front of the knife. The web is adjusted before the machine is started in operation by the hand wheel on shaft 78 and the distance it is fed forward by each action of the lever arm is determined by the adjustment of the plate 84, which raises the pawl 82 out of engagement with its ratchet; by dropping the plate it will engage the pawl after the ratchet has revolved but a short distance, causing a short feed, and by raising the plate it will allow the ratchet to be forced through a greater portion of a revolution and permit a greater feed. As the cam 66 continues to revolve, roller 75 and arm 73 are again lowered and the pawl dropped back to again engage the ratchet ready for the next operation. The parts are so adjusted that as the paper passes out of contact with rollers 47 and 53 and roller 53 is dropped from contact with the cam rollers, the latter will be in the position from which they started and will be held in such position by the means described, the spring 136 being strong enough to prevent movement of the shaft should the machine be jarred but flexible enough to be raised when the revolution of shaft 64 begins.

When the parts are properly adjusted the addressed slips will be placed in the same relative position on each paper and, if so desired, a blank may be placed on the web between the addresses for different towns, so that as the papers are gathered off of the off bearing carriage they may be properly sorted.

Having thus described my invention, what I claim as new herein and desire to secure by Letters Patent is:—

1. In an addressing machine, the combination with a paper conveying mechanism comprising a sleeve, conveyer belts and means for actuating same, a web forwarding mechanism comprising a frame for holding a paper against said sleeve, a reciprocatory knife for cutting the web, a roller for holding a severed portion of the web against the paper traveling on said belts, and a normally inert transmitting mechanism for actuating said web forwarding mechanism and knife only while a paper is traveling through the machine.

2. In an addressing machine, the combination with paper conveying mechanism and means for actuating same, of a web forwarding mechanism comprising a belt adapted for feeding a web over said paper conveying mechanism, a reciprocatory knife for cutting the web, a roller for pressing a severed part of the web against a paper traveling on the conveying mechanism, and means controlled by a paper passing over the conveying mechanism for successively operating the web forwarding and cutting mechanisms.

3. In an addressing machine, the combination of a paper conveying mechanism and means for actuating same, a web forwarding mechanism located above the path of travel of said conveying mechanism, a roller spaced from said conveying mechanism and adapted for driving connection therewith when a paper is passed therebetween, a cam roller having frictional driving contact with said first named roller, a lever having operative connection with said cam roller and adapted for actuating the web forwarding mechanism, and means for yieldably locking said cam.

4. In an addressing machine, the combination with a paper conveying mechanism and means for actuating same, a web forwarding mechanism comprising a belt, means for intermittently actuating said belt, means for separating a web from the belt, a reciprocatory knife adapted for severing a projected portion of the web, means for reciprocating said knife, and a roller carried by the knife and adapted for pressing the severed portion of the web against a paper traveling on the conveying mechanism.

5. In an addressing machine, the combination with a paper conveying mechanism and means for actuating same, a web forwarding mechanism located above the paper conveying mechanism, comprising a belt, a means for actuating same, rollers for guiding the travel of said belt, means for deliving paste to one of said rollers, means for separating a web from said belt, a reciprocatory knife for severing a separated part of the web, means for actuating said knife, and a roller carried by the knife and adapted for pressing a severed part of the web against a paper carried on the paper conveying mechanism.

6. In an addressing machine, the combination with a paper conveying mechanism and means for actuating same, of a web forwarding mechanism comprising a plurality of rollers, a belt running over said rollers, a ratchet fixed to one of the rollers, a pawl adapted for engagement with said ratchet and having an upturned nose, a plate covering part of the ratchet and adapted for engagement by the pawl nose, and means for adjusting said plate, a knife for severing a web, means for actuating the knife, and means for pressing a severed web portion upon a paper.

7. In an addressing machine, a cylinder, means for conveying a paper through the machine, wings revolubly mounted on the cylinder shaft, a paper supporting platform carried by said wings, paper forwarding mechanism carried by said wings, means on said cylinder for operating said forwarding mechanism, a conveyer, and web forwarding, cutting and affixing mechanisms operable from the conveyer.

8. In an addressing machine, a cylinder, means for conveying a paper through the machine, wings revoluble on the cylinder shaft, a paper supporting platform carried by said wings, paper forwarding mechanism revolubly mounted on said wings, means on said cylinder for operating said forwarding mechanism, a web forwarding and cutting mechanism located over the conveyer, and normally inert transmitting mechanism connected with the web feeding and cutting parts and adapted for actuation by a paper passing over the conveyer.

9. In an addressing machine, a cylinder having circumferential slots, rods loosely mounted in the cylinder hub, dogs carried by said rods and projecting through said slots, flanges on said dogs abutting against the inner surface of the cylinder, coil springs surrounding said rods and pressing said flanges, paper forwarding means operated by said cylinder, means for conveying a paper through the machine, web forwarding and cutting mechanism mounted above the conveyer, and arms operable from the paper conveyer for actuating said web forwarding and cutting parts.

10. In an addressing machine, in combination with a paper conveying mechanism, a web forwarding mechanism operable from the paper conveying mechanism, a rock shaft, a crank arm rigid on said rock shaft, a sliding knife frame connected with said crank arm, a bracket rigid on said rock shaft, a block in said bracket, means for adjusting said block, means connected with said block for rocking said bracket, and means for affixing a severed web section on a paper.

11. In an addressing machine, in combination with a paper conveying mechanism, a web forwarding mechanism, a shaft mounted in a suitable frame, a crank arm rigid on said shaft, a sliding knife frame connected with said crank arm, a bracket rigid on said shaft, a block in said bracket, a set screw extending through threaded perforations in said block and in the top and bottom of said bracket, means connected with said block and operable from the paper conveying mechanism for rocking said bracket, and means for affixing a severed web section on a paper.

In testimony whereof I affix my signature in presence of two witnesses.

EHREGOTT T. WINKLER.

Witnesses:
MYRTLE M. JACKSON,
FRANK ROSEBERRY.